July 8, 1924.
T. W. SUDDARD
ROLLER
Filed Aug. 23, 1922
1,500,659
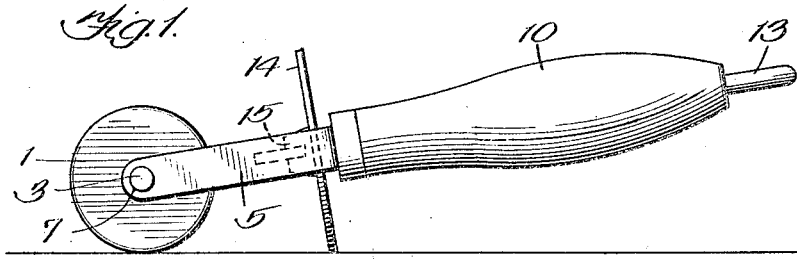
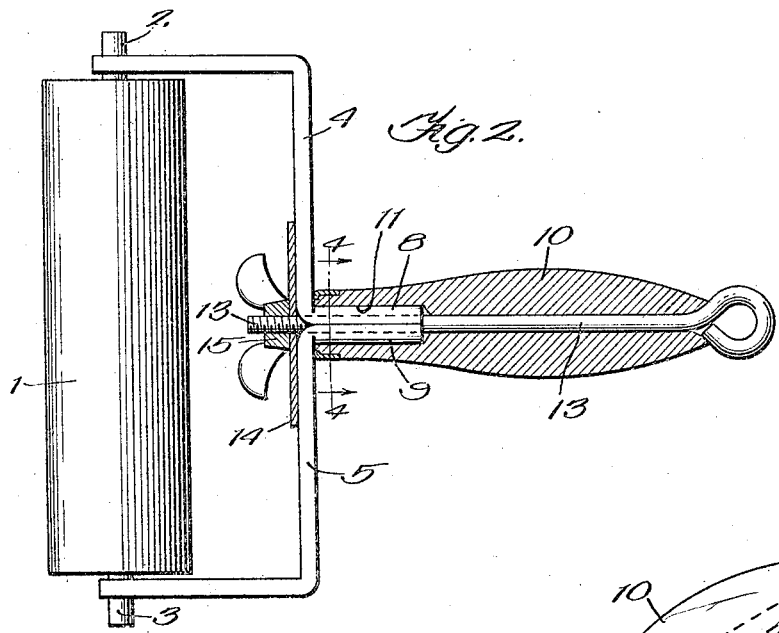
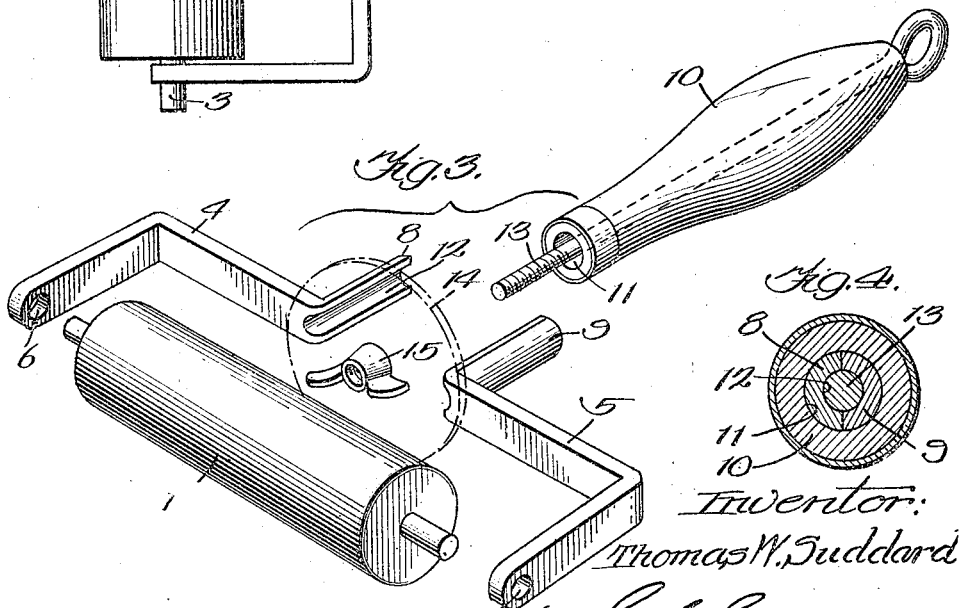
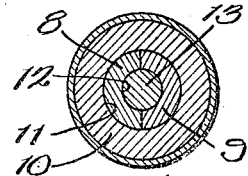
Inventor:
Thomas W. Suddard
By G. L. Bragg, Atty.

Patented July 8, 1924.

1,500,659

UNITED STATES PATENT OFFICE.

THOMAS W. SUDDARD, OF TWO RIVERS, WISCONSIN, ASSIGNOR TO THE HAMILTON MANUFACTURING COMPANY, OF TWO RIVERS, WISCONSIN, A CORPORATION OF WISCONSIN.

ROLLER.

Application filed August 23, 1922. Serial No. 583,712.

*To all whom it may concern:*

Be it known that I, THOMAS W. SUDDARD, citizen of the United States, residing at Two Rivers, in the county of Manitowoc and State of Wisconsin, have invented a certain new and useful Improvement in Rollers, of which the following is a full, clear, concise, and exact description.

My invention relates to rollers and is of particular service when embodied in an inking roller, though the invention is not to be limited to any particular use or adaptation thereof.

In one aspect, the roller of my invention includes the revoluble member thereof and a bail upon and between whose sides said member is mounted to turn, and which bail sides are separable to be relatively adjustable along the axis of the revoluble member. In the preferred embodiment of my invention the means whereby the revoluble member is mounted to turn includes shaft portions that are preferably carried upon opposite sides of the revoluble member and received in journal openings formed in and preferably through the ends of the bail. There is desirably a handle formed with a socket that receives a stem upon the bail, this stem being preferably longitudinally split to permit of adjustment between the sides of the bail. A roller thus constituted permits of the permanent assembly of the shaft portions and the element carrying the same, the formation of the bail into sections permitting the ready assembly thereof with the revoluble member without the necessity of adjusting the shaft portions with respect to the parts carrying them.

In accordance with another characteristic of the invention, the bail, whether or not formed with a stem and in sections, is assembled with the handle by means of a bolt having a nut assembling its inner end with the bail and having its outer end projecting through the outer end of the handle and there having an enlargement that serves to limit the extent to which the nut may draw the bolt toward the revoluble member. This enlargement is desirably shaped into an eye or other support engaging portion that enables the roller to be hung when not in use.

I will explain my invention more fully by reference to the accompanying drawing in which Fig. 1 is a side elevation of the preferred embodiment of the invention; Fig. 2 is a plan view, partially in section, of the roller shown in Fig. 1; Fig. 3 is a perspective view illustrating the parts in separated relation, and showing a washer, that also forms a part of the structure, in dot and dash lines; and Fig. 4 is a sectional view on line 4—4 of Fig. 2.

Like parts are indicated by similar characters of reference throughout the different figures.

The roller illustrated includes a revoluble member 1 that may be of any suitable shape. When embodied in an inking roller, the member 1 is cylindrical and is formed of a material, such as wood, which is adapted to spread ink upon a plate or to take it up from the plate preparatory to its transfer to a printing form. This roller is revolubly supported by two aligned shaft portions 2 and 3 that are preferably rigidly secured to the member 1 from whose ends it projects. These shaft portions may be the ends of one rod passing clear through said member, or they may be short shafts driven tightly into said member.

A bail is provided for supporting the revoluble member, this bail being formed into two rigid separately formed and symmetrically related sections 4 and 5 having bearing openings 6 and 7 formed through each bail end and through which openings the shaft portions may readily be passed by first suitably widening the space between the bail sides to permit of the alignment of the shaft portions with the bearing openings 6 and 7, whereafter the two parts of the bail may readily be brought into assembly with the shaft portions that are placed in the openings thereof.

The bail is preferably formed with a stem divided longitudinally into sections, one stem section 8 being upon the bail section 4 and the other stem section 9 being upon the bail section 5. This bail stem (when the sections thereof are suitably assembled) constitutes a handle portion. This handle portion is desirably supplemented by a gripping portion 10 that may be said to constitute the handle proper. The part 10 is made of any suitable material, wood being preferred. The handle part 10 is formed with a socket 11 that snugly receives the bail stem, whereby the handle part 10 is enabled to hold the stem sections together. The bail stem is desirably formed with a bore 12 for a purpose that will appear.

Supplemental means, co-operating with the handle 10, are desirably added to ensure the continued assembly of handle and stem. The supplemental means includes a bolt 13 passing lengthwise through the handle 10 and through the bore 12 of the stem. A washer 14 has the mid portion of the bail interposed between it and the inner end of the handle and through which said bolt is passed. There is a clamping nut 15 upon the inner end of the bolt, the outer end of the bolt projecting through the outer end of the handle and there enlarged into a support engaging portion, preferably in the form of an eye, that also serves to limit the extent to which the nut may draw the bolt toward the revoluble member. The washer 14 is preferably of sufficient diameter to elevate the handle out of contact with the inking plate when the device is resting thereon.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:—

1. A roller including a revoluble member carrying shaft portions upon opposite sides thereof; a bail between the sides of which said revoluble member is disposed and having openings in its ends in which said shaft portions are mounted to turn, said bail having a stem split lengthwise into sections and formed with a bore extending longitudinally thereof; a handle formed with a socket receiving said stem; a bolt passing lengthwise through the handle and through the bore of the stem; a washer having the mid portion of the bail interposed between it and the inner end of the handle and through which said bolt is passed; and a clamping nut upon the inner end of the bolt, the outer end of the bolt projecting through the outer end of the handle and there enlarged into a support engaging portion that also serves to limit the extent to which the nut may draw the bolt toward the revoluble member.

2. A roller including a revoluble member carrying shaft portions upon opposite sides thereof; a bail between the sides of which said revoluble member is disposed and having openings in its ends in which said shaft portions are mounted to turn, said bail having a stem split lengthwise into sections and formed with a bore extending longitudinally thereof; a handle formed with a socket receiving said stem; a bolt passing lengthwise through the handle and through the bore of the stem; a washer having the mid portion of the bail interposed between it and the inner end of the handle and through which said bolt is passed; and a clamping nut upon the inner end of the bolt, the outer end of the bolt projecting through the outer end of the handle and there having an enlargement that serves to limit the extent to which the nut may draw the bolt toward the revoluble member.

3. A roller including a revoluble member carrying shaft portions upon opposite sides thereof; a bail between the sides of which said revoluble member is disposed and having openings in its ends in which said shaft portions are mounted to turn, said bail having a stem split lengthwise into sections and formed with a bore extending longitudinally thereof; a handle formed with a socket receiving said stem; a bolt passing lengthwise through the handle and through the bore of the stem; and a clamping nut upon the inner end of the bolt, the outer end of the bolt projecting through the outer end of the handle and there enlarged into a support engaging portion that also serves to limit the extent to which the nut may draw the bolt toward the revoluble member.

4. A roller including a revoluble member carrying shaft portions upon opposite sides thereof; a bail between the sides of which said revoluble member is disposed and having openings in its ends in which said shaft portions are mounted to turn, said bail having a stem split lengthwise into sections and formed with a bore extending longitudinally thereof; a handle formed with a socket receiving said stem; a bolt passing lengthwise through the handle and through the bore of the stem; and a clamping nut upon the inner end of the bolt, the outer end of the bolt projecting through the outer end of the handle and there having an enlargement that serves to limit the extent to which the nut may draw the bolt toward the revoluble member.

5. A roller including a revoluble member carrying shaft portions upon opposite sides thereof; a bail between the sides of which said revoluble member is disposed and having openings in its ends in which said shaft portions are mounted to turn, said bail having a stem split lengthwise into sections and formed with a bore extending longitudinally thereof; a handle formed with a socket receiving said stem; a bolt carried by the handle and passing lengthwise through the bore of the stem; and a clamping nut upon the inner end of the bolt.

6. A roller including a revoluble member;

a bail upon and between the sides of which said revoluble member is mounted to turn; a handle; a bolt passing lengthwise through said handle; and a clamping nut upon the inner end of the bolt, the outer end of the bolt projecting through the outer end of the handle and there having an enlargement that serves to limit the extent to which the nut may draw the bolt toward the revoluble member.

In witness whereof, I hereunto subscribe my name this 5th day of August A. D., 1922.

THOS. W. SUDDARD.